US010952574B2

(12) United States Patent
Fraser

(10) Patent No.: US 10,952,574 B2
(45) Date of Patent: Mar. 23, 2021

(54) TRASH ANCHOR DEVICE

(71) Applicant: Leighton Fraser, Union, NJ (US)

(72) Inventor: Leighton Fraser, Union, NJ (US)

( * ) Notice: Subject to any disclaimer, the term of this patent is extended or adjusted under 35 U.S.C. 154(b) by 0 days.

(21) Appl. No.: 16/812,280

(22) Filed: Mar. 7, 2020

(65) Prior Publication Data

US 2020/0216260 A1 Jul. 9, 2020

Related U.S. Application Data

(60) Provisional application No. 62/595,481, filed on Dec. 6, 2017.

(51) Int. Cl.
*F16M 13/00* (2006.01)
*A47K 13/16* (2006.01)
*B65F 1/14* (2006.01)

(52) U.S. Cl.
CPC .............. *A47K 13/16* (2013.01); *B65F 1/141* (2013.01)

(58) Field of Classification Search
CPC ........ B65F 1/141; B65F 1/1615; B65F 1/163; B65F 1/1468
USPC ................................ 248/95, 97, 98, 99, 101
See application file for complete search history.

(56) References Cited

U.S. PATENT DOCUMENTS 2,260,570 A * 10/1941 John ....................... B65F 1/141 248/147
2,471,257 A * 5/1949 Blank ..................... B65F 1/141 248/146
2,891,753 A * 6/1959 Bittle ...................... B65F 1/141 248/149
2,930,561 A * 3/1960 Bittle ...................... B62B 1/264 248/149
3,224,595 A * 12/1965 William ................ B65F 1/1421 211/83
3,235,213 A * 2/1966 Hall ...................... B65F 1/1421 248/146
5,354,023 A * 10/1994 Meeks .................... B05B 11/00 248/129

* cited by examiner

*Primary Examiner* — Steven M Marsh
(74) *Attorney, Agent, or Firm* — Bruce A. Lev

(57) ABSTRACT

A trash can anchor device structured and arranged to releasably hold an outdoor trash can and prevent it from being toppled over by gusts of wind or stray animals foraging for food.

6 Claims, 4 Drawing Sheets

TRASH ANCHOR DEVICE

CROSS-REFERENCE TO RELATED APPLICATION

The present application is related to and claims priority from prior provisional application Ser. No. 62/595,481, filed Mar. 8, 2019 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. FIELD OF THE INVENTION

The present invention relates generally to the field of support devices and more specifically relates to a trash anchor device structured and arranged to prevent an outdoor trash can from being toppled by a strong gust of wind thereby alleviating the stress that comes with throwing the trash out.

2. DESCRIPTION OF THE RELATED ART

A waste container is a container for temporarily storing waste and is usually made out of metal or plastic. As of now, throwing out the trash has turned form a household chore to a constant annoyance. There are moments where the trash-can is toppled over because of extreme weather conditions or when a moving car gets too close to the can. This results to having garbage spread all over the ground. Therefore a need exists for a device that will prevent the trash can from being blown onto the street, create a traffic hazard, or spilled from an overturned trash can.

Ideally, a trash anchor device structured and arranged to prevent an outdoor trash can from being toppled by a strong gust of wind thereby alleviating the stress that comes with throwing the trash out should be user-friendly and safe in-use and yet would operate reliably and be manufactured at a modest expense. Thus, a need exists for a trash anchor device structured and arranged to prevent an outdoor trash can from being toppled by a strong gust of wind thereby alleviating the stress that comes with throwing the trash out and to avoid the above-mentioned problems.

BRIEF SUMMARY OF THE INVENTION

In view of the foregoing disadvantages inherent in the known support device art, the present invention provides a novel Trash Anchor Device. The general purpose of the present invention, which will be described subsequently in greater detail is to provide a Trash Anchor Device structured and arranged to prevent an outdoor trash can from being toppled by a strong gust of wind thereby alleviating the stress that comes with throwing the trash out.

A trash can anchor device comprising: a control bar; a grip handle operably connected to a top of the control bar to allow a user to tilt and push or pull the trash can anchor device; a pair of wheels operably connected to at a base of the control bar to allow a user to roll the trash can anchor device when tilted; a metal horseshoe-shaped part operably connected at a middle part to the base of the control bar to provide lateral stability to a trash can; a spring collar and magnet device, wherein the spring collar and magnet device is attached to the metal horseshoe-shaped part at the middle part to magnetically attract and secure a trash can; and a scoop attachment having one or more bars operably connected to the control bar or the metal horseshoe-shaped part or the control bar and the metal horseshoe-shaped part to provide support to a base of the trash can if the trash can anchor is tilted by a user.

The control bar includes a slot running longitudinally along the control bar and a slideable lid brace operably positioned with one end in the slot to slide up and down the slot so that a user can select a height at which to position the lid brace. Wherein an open part of the metal horseshoe-shaped part faces away from the wheels. Wherein the wheels are located on an opposing side of the control bar from the metal horseshoe-shaped part.

The present invention holds significant improvements and serves as a Trash Anchor Device. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, Trash Anchor Device, constructed and operative according to the teachings of the present invention.

Figure 1:
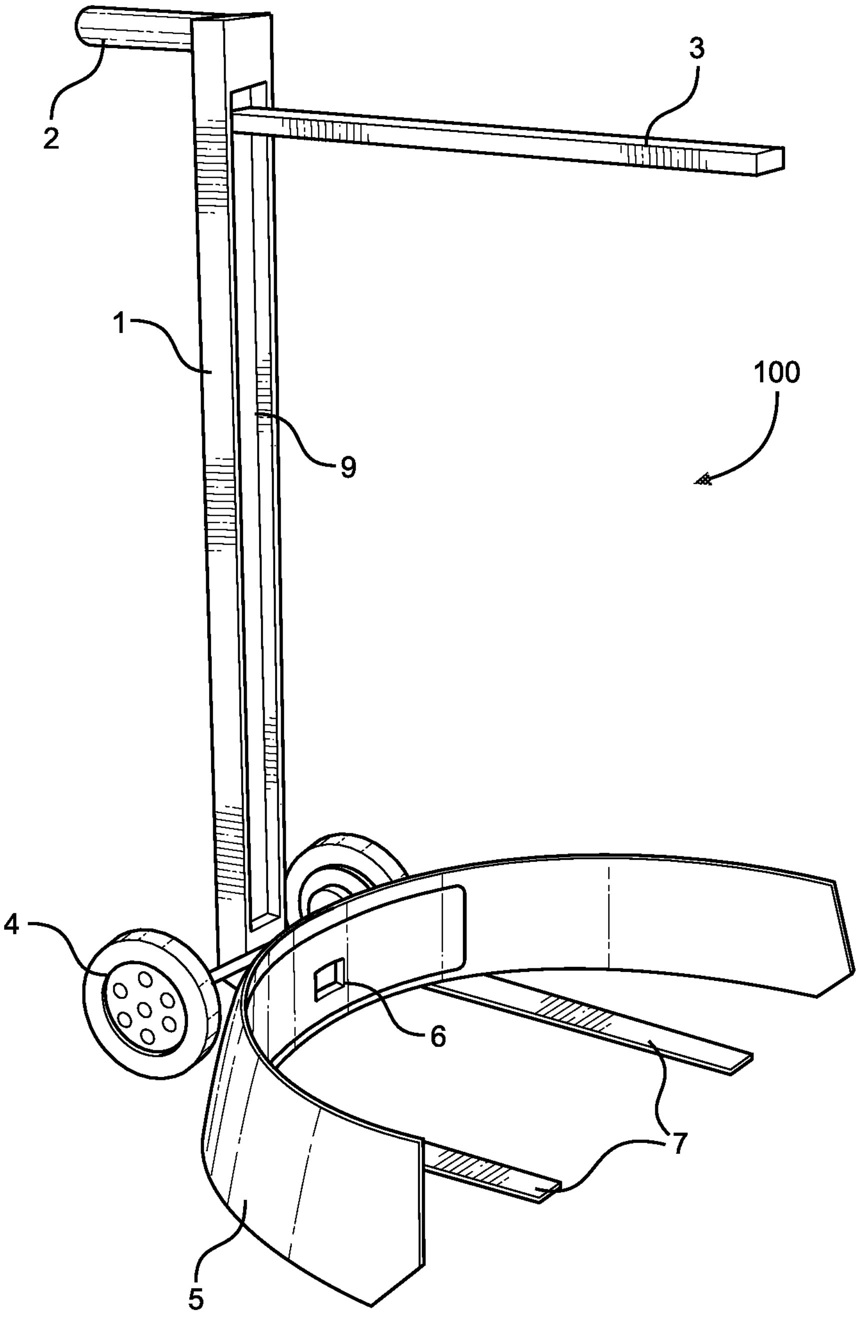
FIG. 1 shows a perspective view illustrating a trash can anchor with the lid brace raised, according to an embodiment of the presently claimed invention.
Figure 2:
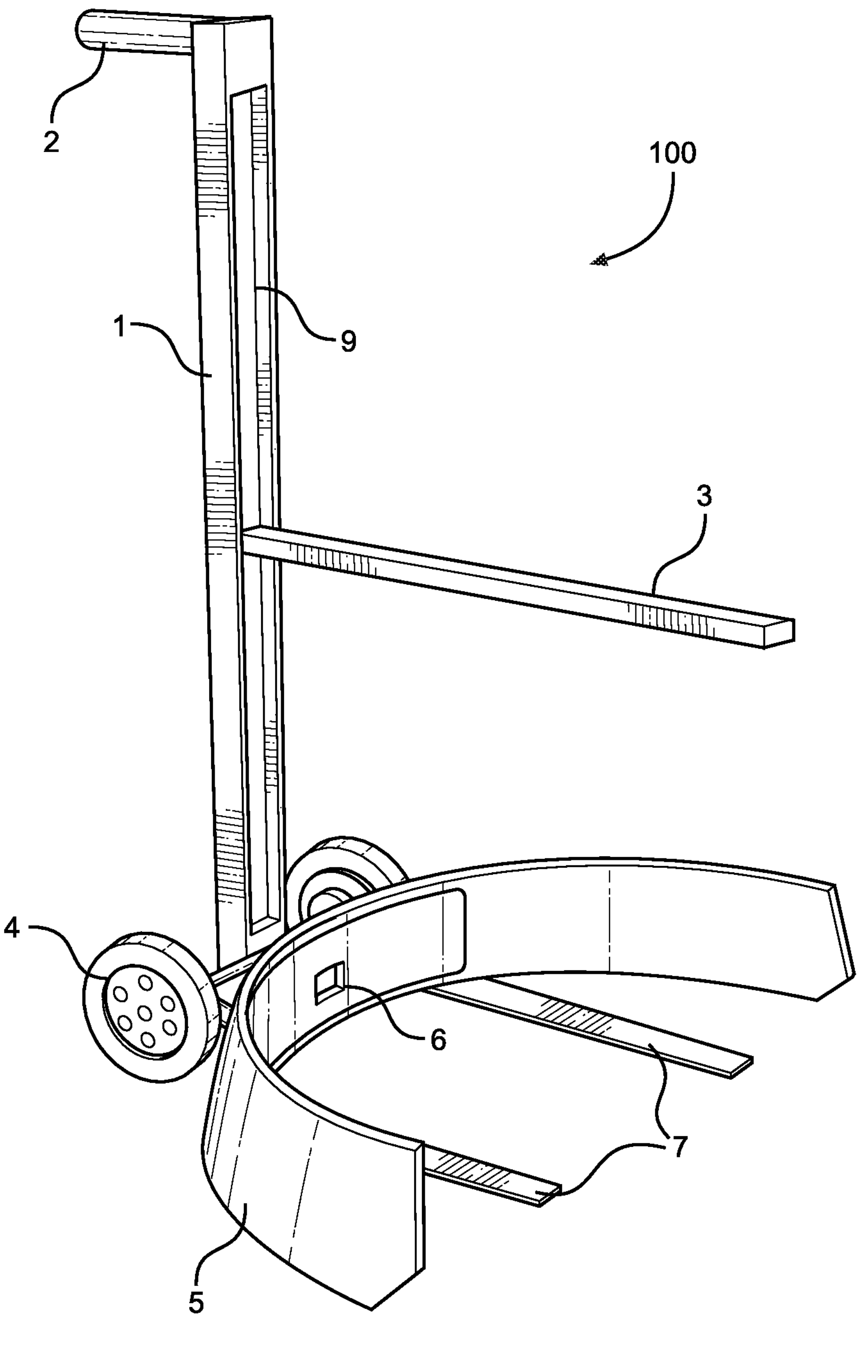
FIG. 2 shows a perspective view illustrating a trash can anchor with the lid brace lowered, according to an embodiment of the presently claimed invention.

The various embodiments of the present invention will hereinafter be described in conjunction with the appended drawings.

DETAILED DESCRIPTION

As discussed above, embodiments of the present invention relate to a support device and more particularly to a Trash Anchor Device structured and arranged to prevent an outdoor trash can from being toppled by a strong gust of wind thereby alleviating the stress that comes with throwing the trash out Referring now to the drawings FIGS. 1-4, the Trash Anchor Device is an innovative take to taking out the trash. Instead of using a regular trash can that is prone to falling, the Trash Anchor will not only secure the trash can where it's positioned but it will also prevent any animals from knocking over or opening the trash can. The Trash Anchor Device provides portability, ease of attachment and use, convenience, durability, and prevention of traffic obstruction and potential accidents.

As shown in FIGS. 1-4, the trash anchor device 100 includes a metal horseshoe-shaped piece 5 attached to the base of an elongated control bar 1. A grip handle 2 is located at the top of the elongated control bar 1 so that it can be used to roll the trash anchor device 100 along the ground using a set of wheels 4 located at the base of the elongated control bar 1, behind the metal horseshoe piece 5.

Figure 3:
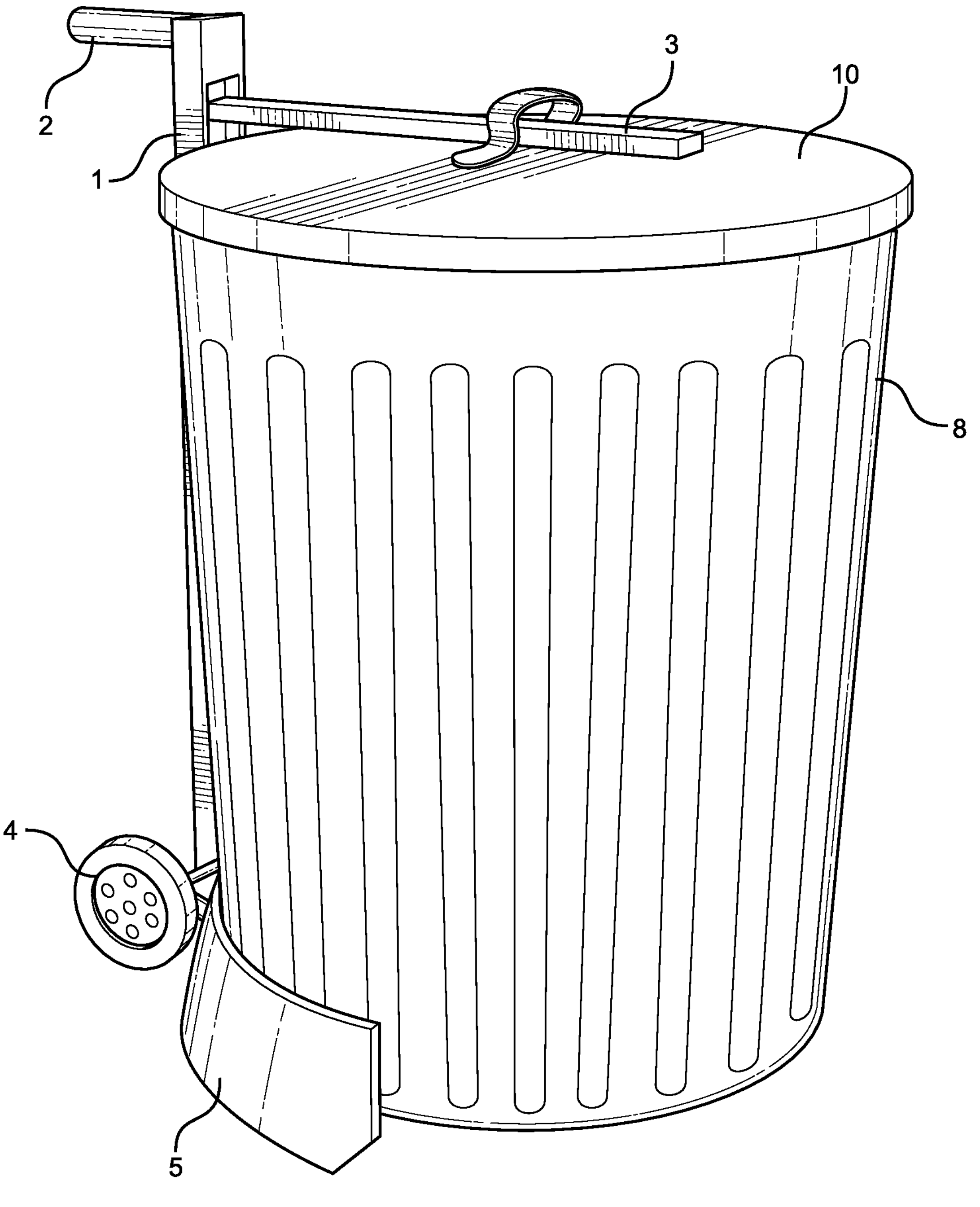
FIG. 3 shows a perspective view illustrating a trash can anchor with the trash can in place, according to an embodiment of the presently claimed invention.

A moveable lid brace 3 can slide up and down a slot 9 in the body of the control bar 1 and be selectively releasably held therein so that a user can position the lid brace 3 at the correct height to secure the lid 10, as shown in FIG. 3. Securing the lid 10 with the lid brace 3 prevents wild animals, such as raccoons, squirrels, and opossums, from getting into the garbage. Mechanisms to releasably hold the moveable lid brace 3 within slot 9 include a pawl and ratchet system, a rack and pinion system, friction screws, or the like.

Figure 4:
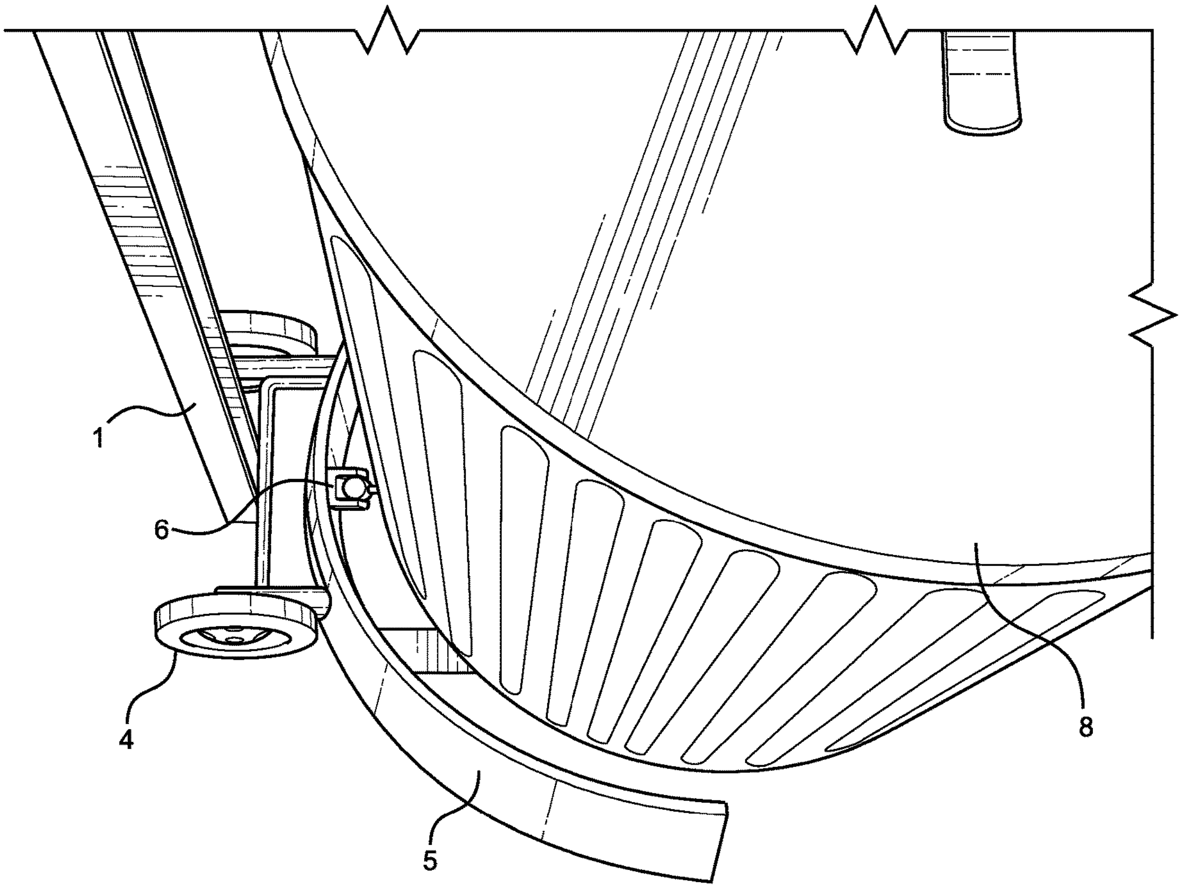
FIG. 4 shows a top view illustrating a trash can anchor with the trash can in place, according to an embodiment of the presently claimed invention.

The metal horseshoe piece 5 may houses a spring collar and/or magnet 6 that, as shown in FIG. 4, attracts trash cans to the metal horseshoe piece 5. The magnet 6 may preferably be formed as an elongated bar being 4 to 5 inches wide and approximately 8 inches high.

A scoop attachment 7 may include a pair of spaced elongated support bars and is connected to the control bar 1 and the metal horseshoe piece 5 so that it supports the base of the trash can 8, allowing a user to tilt the trash can 8 in the trash anchor device 100 for ease in rolling.

The metal horseshoe piece 5 anchors the trash can 8 in an upright position by providing stability and support around the sides, while the scoop attachment 7 provides support from below, and the control bar 1 provides support from the back. The trash anchor thereby secures trash cans from being whipped by wind and makes it easier for trash collectors than having to pick up the can by its handles or body. It should be noted that other shapes can be suitable used besides metal horseshoe piece 5 to anchor trash can 8 such as oblong, rectangular, spherical to accommodate different trash cans 8.

The trash anchor device is preferably made from fortified plastic and/or spring metal materials, such as spring steel.

Upon reading this specification, it should be appreciated that, under appropriate circumstances, considering such issues as user preferences, design preference, structural requirements, marketing preferences, cost, available materials, technological advances, etc., other material arrangements and combinations may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed:

1. A trash can anchor device comprising:
- an elongated control bar having:
  - a top portion;
  - a base portion;
  - a length; and
  - a slot running along said length;
- an elongated lid brace;
  - wherein said elongated lid brace is operably positioned with one end within said slot and adapted to slide up and down within said slot such that a user can select a height at which to position said elongated lid brace;
- a grip handle;
  - wherein said grip handle is operably connected to said top portion of said elongated control bar and adapted to allow a user to tilt and push or pull said trash can anchor device;
- a pair of wheels;
  - wherein said pair of wheels are operably connected to said base portion of said elongated control bar and adapted to allow a user to roll said trash can anchor device when tilted;
- a horseshoe-shaped piece;
  - wherein said horseshoe-shaped piece is operably connected at a middle section thereof to said base of said elongated control bar to provide lateral stability to a trash can being held by said trash can anchor device,
- wherein said wheels are located on an opposing side of said control bar from said horseshoe-shaped piece;
- a magnet;
  - wherein said magnet is attached to said horseshoe-shaped piece to magnetically attract and secure a metal trash can; and
- a scoop attachment including:
  - a pair of elongated support bars;
  - wherein said scoop attachment is operably connected to said control bar and said metal horseshoe-shaped piece to provide support to a base of a trash can being held by said trash can anchor device.

2. The trash can anchor device according to claim 1, wherein said magnet has a width of between four and five inches, and a height of eight inches.

3. The trash can anchor device according to claim 1, wherein said elongated control bar, said grip handle, said elongated lid brace, said pair of wheels, and said scoop attachment are each formed from materials selected from a group of materials consisting of fortified plastic materials and spring metal materials.

4. A combination of a trash can and a trash can anchor device, comprising:
- a trash can including:
  - a main body;
    - wherein said main body is formed having a cylindrical shape and forms an interior hollow cylindrical interior volume; and a lid including:

a handle;

wherein said lid is adapted to removably cover a top portion of said main body and releasably enclose said hollow cylindrical interior volume of said main body; and a trash can anchor device comprising:

an elongated control bar having:

a top portion;

a base portion;

a length; and a slot running along said length;

an elongated lid brace;

wherein said elongated lid brace is operably positioned with one end within said slot and adapted to slide up and down within said slot such that a user can select a height at which to position said elongated lid brace; and wherein said elongated lid brace is adapted to engage and hold in place said handle of said lid of said trash can;

a grip handle;

wherein said grip handle is operably connected to said top portion of said elongated control bar and adapted to allow a user to tilt and push or pull said trash can anchor device;

a pair of wheels;

wherein said pair of wheels are operably connected to said base portion of said elongated control bar and adapted to allow a user to roll said trash can anchor device when tilted;

a horseshoe-shaped piece;

wherein said horseshoe-shaped piece is operably connected at a middle section thereof to said base of said elongated control bar to provide lateral stability to said main body of said trash can being held by said trash can anchor device, wherein said wheels are located on an opposing side of said control bar from said horseshoe-shaped piece;

a magnet;

wherein said magnet is attached to said horseshoe-shaped piece to magnetically attract and secure said main body of said trash can being held by said trash can anchor device; and a scoop attachment including:

a pair of elongated support bars;

wherein said scoop attachment is operably connected to said control bar and said metal horseshoe-shaped piece to provide support to said main body of said trash can being held by said trash can anchor device.

5. The trash can anchor device according to claim 4, wherein said magnet has a width of between four and five inches, and a height of eight inches.

6. The trash can anchor device according to claim 4, wherein said elongated control bar, said grip handle, said elongated lid brace, said pair of wheels, and said scoop attachment are each formed from materials selected from a group of materials consisting of fortified plastic materials and spring metal materials.

* * * * *